Patented Sept. 11, 1945

2,384,726

UNITED STATES PATENT OFFICE 2,384,726

ETHER ESTERS

Donald Drake Coffman, Lindamere, Del., assignor to E. I. du Pont de Nemours & Company, Wilmington, Del., a corporation of Delaware No Drawing. Application November 28, 1942, Serial No. 467,209

4 Claims. (Cl. 260—484)

This invention relates to 1-acyloxyethyl ethers of alpha-hydroxy acid esters and a process for preparing the same.

This invention has as an object the provision of a process for making new ether esters. Another object comprises a novel and useful class of compounds—that of 1-acyloxyethyl ethers of alpha-hydroxy acid esters. A further object is the preparation of new plasticizers for cellulose esters and synthetic resins. Other objects will appear hereinafter.

These objects are accomplished by the following invention wherein a vinyl ester, free from aliphatic unsaturation and from active hydrogen and preferably a neutral ester, of an organic carboxylic acid is reacted with an alkyl ester of a saturated alpha-hydroxy acid in the presence of a mercuric catalyst under substantially anhydrous conditions at an elevated temperature, i. e., 30° to 150° C., but preferably 70° to 100° C.

The more detailed practice of the invention is illustrated by the following example wherein parts given are by weight. There are, of course, many forms of the invention other than this specific embodiment.

Example

In a vessel provided with heating elements and equipped with a reflux condenser, stirrer, thermometer, and an inlet for introducing liquids, were placed 500 parts of methyl hydroxyacetate and 50 parts of anhydrous mercuric phosphate. The suspension was stirred and heated to 75° to 80° C., when 550 parts of vinyl acetate was added through the inlet tube at such a rate that the addition required about 6 hours. The reaction mixture was stirred for an additional 2 hours at 75° to 80° C. At the end of this time, the temperature was raised to 100° C. and the stirred mixture maintained at this temperature for 10 hours. At the end of this time the heating and stirring were discontinued, and the liquid portion after separation from the solid catalyst was fractionally distilled at 2 to 3 mm. mercury. In this manner, 351 parts of the 1-acetoxyethyl ether of methyl hydroxyacetate was obtained which distilled at 66° to 67° C./2 to 3 mm. A sample on analysis had the following properties:

| | Calculated | Found |
|---|---|---|
| C...........................percent.. | 47.83 | 47.74 |
| H...........................do..... | 6.88 | 7.28 |
| Saponification number.................... | 88.08 | 88.10 |
| $d_x$.................... | | 1.1224 |
| $N_{15}{}^D$.................... | | 1.4170 |
| Molecular refraction.................... | 39.48 | 39.43 |

In place of the methyl hydroxyacetate of the above example there may be employed any alkyl ester of a saturated alpha-hydroxy acid including methyl hydroxyacetate, isobutyl lactate, cyclohexyl alpha-hydroxybutyrate, benzyl malate, furfuryl alpha-hydroxyisobutyrate, dodecyl alpha-hydroxyvalerate, ethyl mandelate, isopropyl benzilate, propyl tartrate, butyl citrate, t-butyl mucate, ethyl furfurylhydroxyacetate, methyl cyclohexylhydroxyacetate, methyl p-chloromandelate, and, in general, any alkyl ester of a saturated alpha-hydroxy carboxylic acid. The alpha carbon, bearing as it does both the hydroxyl and carboxyl, cannot be aromatic but the rest of the molecule may be aliphatic, alicyclic, aromatic, or heterocyclic, monocarboxylic or polycarboxylic. Neutral esters are preferred in the case of polycarboxylic acid esters. The alkyl esters of hydroxy fatty acids are preferred reactants.

For reaction with the methyl hydroxyacetate and, in general, for reaction with the alkyl esters of the alpha-hydroxy acid, there may be employed any monomeric vinyl ester of an organic carboxylic acid which is free from active hydrogen as determined by the Zerewitenoff method and also free from aliphatic unsaturation, i. e., of the ethylene, acetylene, and cyclohexene types, including vinyl esters of saturated aliphatic, alicyclic, heterocyclic and aromatic monocarboxylic and polycarboxylic acids, for example, vinyl formate, acetate, propionate, butyrate, pivalate, laurate, stearate, benzoate, naphthoate, chloroacetate, methoxyacetate, pyridinecarboxylate, adipate, and sebacate. Esters of hydrocarbon carboxylic acids, i. e., those acids in which the molecule is hydrocarbon except for the carboxyl group or groups are preferred. In the case of polycarboxylic acids, the neutral esters are preferably employed, e. g. divinyl adipate or vinyl ethyl adipate. Vinyl esters of saturated fatty acids, e. g., the formate, acetate, propionate, stearate, are preferably employed. The vinyl ester is of course the monomeric ester.

In the process of this invention catalysts may be employed. Those catalysts which catalyze the formation of ethylidene derivatives in the reaction of hydroxy compounds with acetylene are preferred, including mercuric phosphate, mercuric acetate, mercuric sulfate, and mixtures of mercuric oxide with boron trifluoride in the form of complexes of the latter with such compounds as ether, methanol, acetic acid, and water ($BF_3 \cdot H_2O$ and $BF_3 \cdot 2H_2O$), but preferably with methanol. Mixtures of mercuric oxide with silicon tetrafluoride complexes (with water but preferably with methanol) can also be used. The reaction should be carried out under substantially anhydrous conditions.

The temperature of the reaction may be 30°–150° C., the preferable range being 70°–100° C. In case one of the reactants is low boiling, i. e., in the range of 70°–100° C., the preferable maximum temperature will be the reflux temperature of the low boiling reactant. In some cases, such as with vinyl formate, or the use of diethyl ether as a solvent, the preferable range is above the boiling point of the mixture and necessitates operating at super-atmospheric pressure, i. e., in a closed system.

Inert solvents such as benzene, 1,4-dioxane, ethyl acetate, toluene, and diethyl ether may be employed without any deleterious effect on the course of the reaction. The invention may also be operated at atmospheric or superatmospheric pressures which is necessitated in some cases as already indicated.

The products of this invention have the following formula

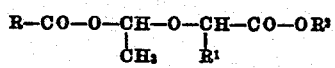

wherein R is hydrogen or an organic radical free from active hydrogen and ethylenic and acetylenic unsaturation and is preferably hydrocarbon. $R^1$ is hydrogen or an organic radical free from ethylenic and acetylenic unsaturation and preferably saturated hydrocarbon or hydrogen and $R_2$ is an alkyl radical. They are oily liquids to low melting waxy solids which on hydrolysis with dilute (e. g. 5%) aqueous mineral acid (hydrochloric or sulfuric) e. g., by refluxing one hour yield acetaldehyde, an alkanol $R^2OH$, an acid $R \cdot CO \cdot OH$, and an alpha-hydroxy acid

where R, $R^1$, and $R^2$ have the significance above given. Thus, the product of the example, the 1-acetoxyethyl ether of methyl hydroxyacetate yields acetaldehyde, methanol, hydroxyacetic acid and acetic acid.

The 1-acyloxyethyl ethers of alpha-hydroxy acid esters may be employed as intermediates which by pyrolysis are converted to the vinyl ethers of alpha-hdroxy acid esters.

The higher molecular weight compounds may be employed as plasticizers for cellulose derivatives such as cellulose acetate and cellulose nitrate, or for other common plastics such as polyvinyl chloride or polymethyl methacrylate.

The term "saturated" is used herein to express freedom from ethylenic and acetylenic unsaturation.

The term "active hydrogen" (Whitmore 1937, page 214) is used to represent hydrogen shown in the Zerewitinoff method.

The above description and example are intended to be illustrative only. Any modification of or variation therefrom which conforms to the spirit of the invention is intended to be included within the scope of the claims.

What is claimed is:

1. The process which comprises reacting methyl hydroxyacetate with vinyl acetate in the presence of mercuric phosphate at 70–100° C. and under anhydrous conditions.

2. The 1-acetoxyethyl ether of methyl hydroxyacetate.

3. The process which comprises reacting an alkyl ester of an alpha-hydroxy alkanoic acid in the presence of a mercuric catalyst at 30–100° C. under anhydrous conditions with the vinyl ester of an alkanoic acid.

4. An ether ester of ethylidene glycol having one hydroxyl etherified with an alpha-hydroxy alkanoic acid alkyl ester and the other hydroxyl esterified with an alkanoic acid.

DONALD DRAKE COFFMAN.